US007962319B2

(12) United States Patent
Grayson

(10) Patent No.: US 7,962,319 B2
(45) Date of Patent: Jun. 14, 2011

(54) METHOD AND SYSTEM FOR UPDATING RELIABILITY PREDICTION MODELS FOR DOWNHOLE DEVICES

(75) Inventor: William R. Grayson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1793 days.

(21) Appl. No.: 10/793,161

(22) Filed: Mar. 4, 2004

(65) Prior Publication Data
US 2005/0197813 A1 Sep. 8, 2005

(51) Int. Cl.
*G06G 7/50* (2006.01)
(52) U.S. Cl. ........................................................ 703/10
(58) Field of Classification Search .................. 703/10; 702/9, 130, 141, 176, 182; 700/177, 180
See application file for complete search history.

(56) References Cited

U.S. PATENT DOCUMENTS

| 4,794,534 | A | * | 12/1988 | Millheim | 702/9 |
| 5,592,381 | A | * | 1/1997 | Henneuse et al. | 702/9 |
| 6,993,446 | B2 | * | 1/2006 | Gunawardana et al. | 702/117 |

OTHER PUBLICATIONS

Huitian Lu, et al., "Real-time performance reliability prediction", Dec. 2001, Reliability, IEEE Transactions on, vol. 50, Issue: 4 On pp. 353-357.*

* cited by examiner

*Primary Examiner* — Paul L Rodriguez
*Assistant Examiner* — Luke Osborne
(74) *Attorney, Agent, or Firm* — Mark E. Scott; Conley Rose, P.C.

(57) ABSTRACT

Methods and systems for updating and/or predicting statistical reliability for downhole devices. In some embodiments, the statistical reliability for a device may be predicted prior to using the device to ensure the statistical reliability stays above a preset threshold. In other embodiments, the statistical reliability for a device is tracked substantially simultaneously with use, again to ensure its statistical reliability stays above a predetermined threshold.

9 Claims, 4 Drawing Sheets

METHOD AND SYSTEM FOR UPDATING RELIABILITY PREDICTION MODELS FOR DOWNHOLE DEVICES

BACKGROUND OF THE INVENTION

1. Field of the Invention

The various embodiments of the invention are directed to determining the statistical reliability of a device or group of devices, such as a logging tool. More particularly, the various embodiments of the invention are directed to predicting reliability and/or updating reliability prediction models for downhole devices.

2. Background of the Invention

In drilling boreholes into hydrocarbon-producing reservoirs, it has become commonplace to include in a drill string one or more logging tools. There may be a vast array of combinations of logging-while-drilling (LWD) and measuring-while-drilling (MWD) tools that may be placed within a drillstring, but these tools generally comprise mechanical apparatuses and electrical circuits to perform specific tasks. The time-to-failure of these mechanical and electrical devices may be related to the conditions in which they operate.

The operating environment experienced by downhole devices is very harsh. By virtue of the devices being part of the drillstring, the devices experience relatively high accelerating forces, which may be caused by vibration of the drill bit cutting through the downhole formations. The devices may also experience temperatures far in excess of normal surface conditions. The temperature and vibration experienced may exceed the specified ranges for some of the components that make up the downhole devices, such as electrical components. Thus, the life span of any particular electrical and mechanical device may be related to the amount of time that device operates within high temperature and high vibration environments.

While it may be known that the life span of electrical and mechanical devices may be proportional to operating temperature and vibration experienced, there has not been a mechanism where this information may be tracked real-time or predicted so as to quantify the statistical reliability of a particular tool or downhole assembly.

SUMMARY OF SOME OF THE PREFERRED EMBODIMENTS

The problems noted above are solved in large part by a method and related system for updating and/or predicting statistical reliability for devices using reliability prediction models. At least some exemplary embodiments may be a method comprising operating a downhole device, and updating (e.g. at the rig site) a reliability prediction model for the downhole device using at least one of a downhole condition and an amount of time the downhole device is used downhole.

Other embodiments may be a system comprising a surface computer, and a downhole device coupled within the drill string (wherein the downhole device measures a downhole parameter). The surface computer communicatively couples to the downhole device at the rig site to obtain data regarding the downhole parameter, and the surface computer updates a reliability prediction model for a downhole tool at the rig site using data gathered from the downhole device.

Other exemplary embodiments may be a method comprising predicting reliability for a downhole device using at least one of an expected downhole condition and an expected use time, and selecting the downhole device for use in a drill string if the predicted reliability from the predicting step is above a predetermined threshold.

The disclosed devices and methods comprise a combination of features and advantages which enable it to overcome the deficiencies of the prior art devices. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect electrical connection via other devices and connections. Finally, at least some of the embodiments perform actions "at the rig site," which is intended to mean not only locations proximate to the drilling equipment at the surface, but also the any of the one or more boreholes created by the drilling equipment.

DETAILED DESCRIPTION OF THE PREFERRED EMBODIMENTS

The various embodiments of the invention are directed to determining the statistical reliability of a device while it is in operation, and/or predicting the statistical reliability of a device based on anticipated environmental conditions of the use. Some of the various embodiments are discussed in relation to a logging-while-drilling (LWD) downhole tool; however, the methods and systems described are equally applicable to any downhole device such as a measuring-while-drilling (MWD) tool, or any of the various components used in a drill string such as a mud pulser, mud siren, rotary steerable assembly, and a downhole mud motor. Thus, the description in relation to an LWD tool should not be construed as limiting applicability to only LWD tools, and may include other downhole devices, wireline tools, and/or other electronic or electromechanical devices subjected to harsh operating environments.

Figure 1:
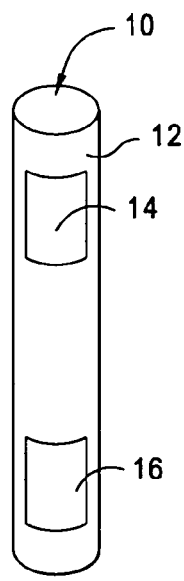
FIG. 1 illustrates a logging-while-drilling tool in accordance with embodiments of the invention.

Downhole devices may comprise many components to perform the overall functionality. In the case of an exemplary LWD tool, these components may comprise a plurality of printed circuit boards, transmitting devices, and detecting or receiving devices. Each individual component of the LWD tool may have an operating time until failure, and thus the LWD tool may likewise have a certain operation time until failure as a function of the individual components. That is, a downhole device may function properly until the failure of a single electronic or electromechanical device. The failure of the device may result in complete failure of the downhole device, or may alternatively make the downhole device work below specification. FIG. 1 illustrates an exemplary LWD tool 10 comprising, for purposes of explanation of the various embodiments, a tool body 12 and electronic inserts 14 and 16. The tool body 12 may be a substantially cylindrical metallic structure that couples within a drill string. The electronic inserts 14, 16 may comprise printed circuit boards, populated with electronic and electromechanical devices, within a protective housing such as a metallic flask (not specifically shown). The electronic inserts 14, 16 may be coupled to the tool body 12. The LWD tool may be any downhole LWD tool, such as an acoustic logging tool, an electromagnetic wave resistivity tool, a neutron porosity tool, and/or directional sensor. The electronic inserts 14, 16 may perform specific tasks related to the type of downhole tool. In the exemplary case of an acoustic logging-while-drilling tool, the electronic insert 14 may control the transmitting devices, and detect signals from the receiving devices. Still in the exemplary case of an acoustic tool, the electronic insert 16 may be responsible for receiving data from the electronic insert 14, doing data manipulation, and/or communicating with a telemetry module (not specifically shown). In the case of an electromagnetic wave resistivity tool, the electronic insert 14 may be responsible for generating appropriate signals for transmission into the surrounding formation, and detecting responsive electromagnetic waves at receiving antennas. In the case of a neutron porosity tool, the electronic inserts 14 and 16 may be the circuit that controls the tool's calibration response to the neutron source.

The tool body 12 may have a time to failure significantly longer than the electronic inserts 14, 16. For purposes of discussing predicting reliability and/or updating reliability prediction models, the tool body 12 will be ignored and the LWD tool 10 will be assumed to have only two components, the electronic inserts 14, 16. However, downhole devices may comprise many components, and the discussion with respect to a downhole device having only two components may be extended to one or more components.

Figure 2:
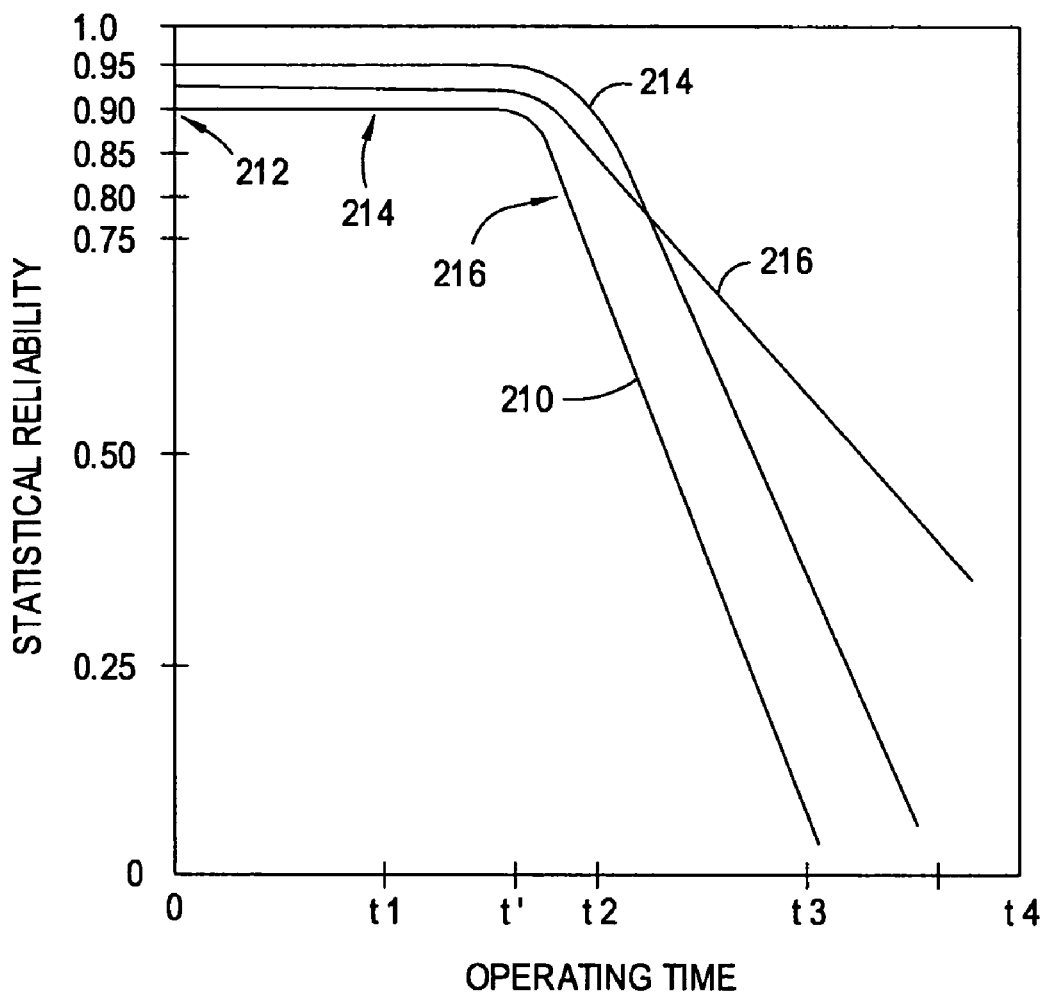
FIG. 2 illustrates an exemplary plot showing statistical reliability of various components, as well as statistical reliability for a device comprising those components.

FIG. 2 illustrates an exemplary plot showing statistical reliability along the ordinate axis, and the use or operating time along the abscissa. Operating time could be any suitable measure of time, e.g. hours, days, weeks, months, years. In the exemplary case of a logging tool, the operating time may be operating hours. While FIG. 2 illustrates operating time as linear, for some devices a logarithmic representation of time may be needed to make statistical reliability plots Look substantially as illustrated in FIG. 2. FIG. 2 shows an exemplary statistical reliability plot 214 for the electronic insert 14, plot 216 for electronic insert 16, and plot 210 for the LWD tool comprising the electronic inserts 14, 16.

Referring initially to the plot 214 with reference to the electronic insert 14, the exemplary graph of FIG. 2 shows that, considered alone, the electronic insert 14 may have a statistical reliability of 0.95 (95%) beginning at a time zero (when the electronic insert 14 is new or has just been repaired, rebuilt, or has had preventative maintenance performed), and for some period of time thereafter. After a certain operating time, the statistical reliability of the electronic insert 14 may decrease, e.g. at accumulated operating time T'. The plot 214 thus exemplifies that, while the electronic insert 14 may fail at any time, the probability of failure increases (the statistical reliability decreases) with increased accumulated operating time. FIG. 2 also illustrates a plot 216 for the electronic insert 16. For purposes of explanation, FIG. 2 shows that the statistical reliability for the electronic insert 16 may be initially lower than that of electronic insert 14, but the statistical reliability for electronic insert 16 decreases at a slower rate than the electronic insert 14. Statistical reliability plots 214 and 216 only illustrate two possible statistical reliabilities. The plots 214, 216 need not have the same point of inflection on accumulated operating hours, and need not necessarily have approximately the same initial statistical reliability. For identical electronic inserts 14, 16, however, the statistical reliabilities may be the same.

The exemplary LWD tool 10 comprises the electronic inserts 14, 16 with their associated statistical reliability. Thus, the statistical reliability for the LWD tool 10 may be a combination of the statistical reliability of its two components being electronic inserts 14, 16. FIG. 2 illustrates an exemplary LWD tool 10 statistical reliability in plot 210.

Consider for purposes of explanation the LWD tool 10 being either new or completely rebuilt. Because of the assumed new or rebuilt condition, the LWD tool 10 may lie on the plot 210 substantially at location 212. As the LWD tool is used, it accumulates operating hours and thus its statistical reliability may change as a function of accumulated operating hours. For example, after accumulating operating hours substantially equal to the generic time T1, the LWD tool statistical reliability will have moved along the plot 210 to substantially location 214. After further accumulation of operating hours, the LWD tool statistical reliability may eventually reach a point where the reliability may be 0.80 (80%), indicated at location 216. If the LWD tool 10 owner/operator has predetermined that a statistical reliability for the tool at 80% or less is undesirable, the tool may be rebuilt, even if it is still operational at the time when its statistical reliability reaches a predetermined threshold.

In accordance with embodiments of the invention, the historical statistical reliabilities of each component of the LWD tool, as well as the historical statistical reliability of the LWD tool itself, may be combined to create a reliability prediction model for the LWD tool that predicts or estimates the current statistical reliability for the LWD tool based, at least in part, on the accumulated operating time of the tool. For example, the historical statistical reliability of the one or more similar LWD tools, as well as the historical statistical reliability of at least some of the individual components that make up the tool, may be analyzed (e.g. using Weibul probability density function) to obtain the reliability prediction model. In some embodiments, the reliability prediction model may be a graph similar to plot 210 of FIG. 2. In this way, whether electronically or manually, using the accumulated operating hours for the LWD tool its predicted statistical reliability may be determined. In alternative embodiments, the reliability prediction model may be a mathematical function which, when provided the accumulated operating hours, generates a predicted statistical reliability.

With these ideas in mind, at least some embodiments of the invention are directed to predicting reliability for a downhole device taking into account expected downhole conditions, and selecting the device for use if predicted reliability is above a predetermined threshold. Additionally and/or alternatively, at least some embodiments of the invention are directed to updating a reliability prediction model for a downhole tool at the rig site using data regarding downhole conditions. Predicting reliability and/or updating reliability prediction models may require maintaining data and reliability prediction models.

Figure 3:
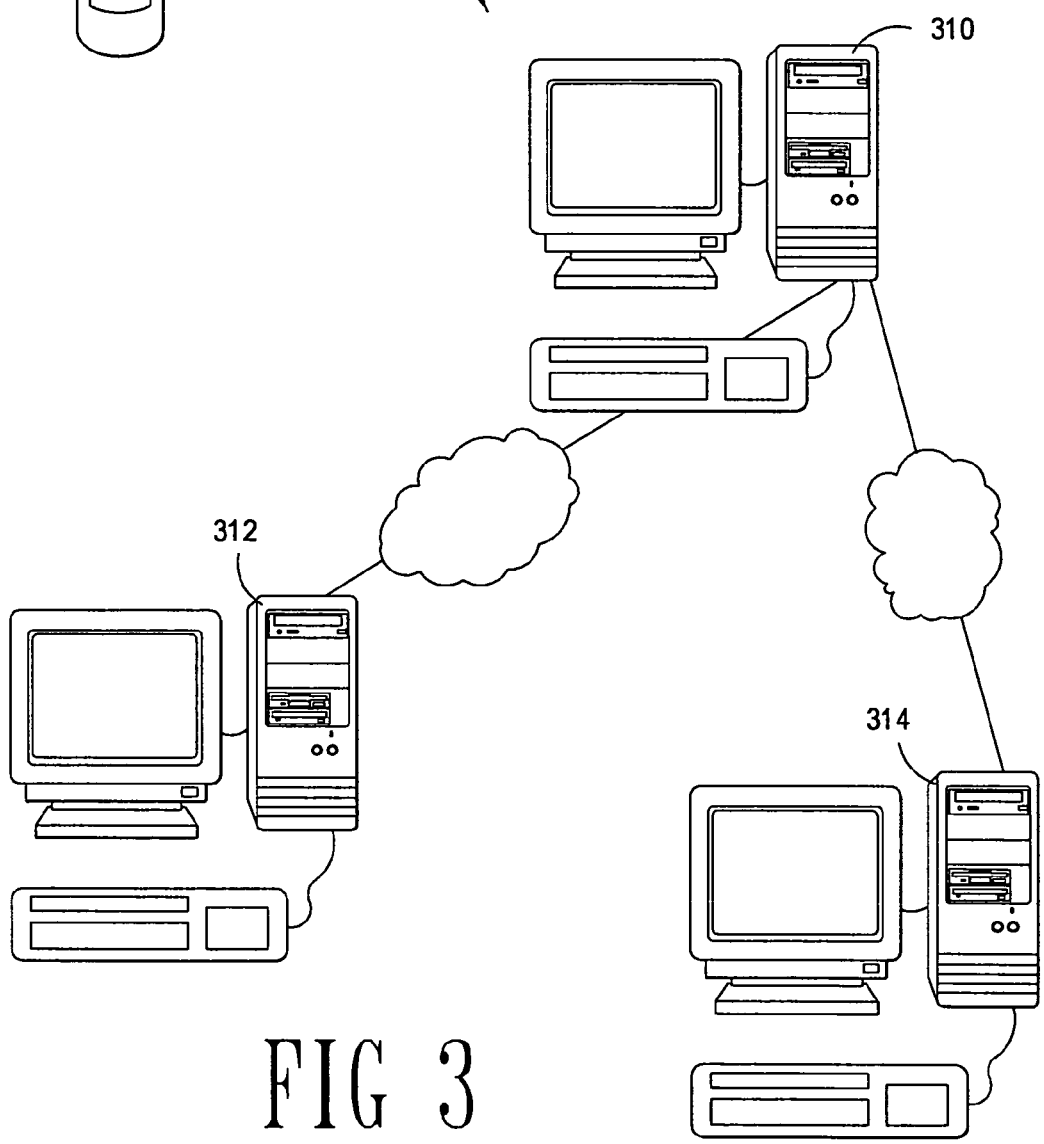
FIG. 3 illustrates a computer system constructed in accordance with embodiments of the invention.

FIG. 3 illustrates a computer network 300 which may be used to maintain the statistical reliability as predicted by reliability prediction models, and maintain the models themselves, for individual components and those components combined into a downhole device. In particular, a home or central computer 310 may be a main storage location for information regarding individual components and devices comprising a plurality of components. Thus, central computer 310 may track historical statistical reliability of individual components and systems of components. The central computer 310 may also use the historical statistical reliability to update and improve reliability prediction models. The reliability prediction models in turn may be used to predict a component's or device's (comprising a plurality of components) statistical reliability using parameters such as expected or actual use time, and/or expected operating temperature.

The central computer 310 may provide the information and models to other locations, such as field office computer 312 and rig site computer 314. The central computer 310 may operate any suitable software program for tracking historical statistical reliability, updating reliability prediction models, and/or calculating statistical reliability of individual components or systems of components. One such software program may be the Product Lifecycle Management software of the suite of software from SAP America, Inc., 3999 West Chester Pike, Newtown Square, Pa. 19073. However, other software products may be developed and/or equivalently used.

Field office computer 312 may couple to the central office computer 310 by any suitable mechanism such as a dedicated telephone line connection, a dial-up connection, and broadband technologies such as cable modems and DSL services. In alternative embodiments, the field office computer 312 may not communicatively couple to the central computer 310, but instead may be periodically updated by other means. Correspondingly, the rig site computer 314 may be proximate to a drilling rig, whether on-shore or off-shore. The rig site computer 314 may couple to the central computer 310 through dedicated telephone line connections, dial-up connections, satellite-type connections, and broadband technologies such as cable modems and DSL services.

The information and models stored regarding the statistical reliability of individual components and systems of components may be accessed, downloaded, and/or updated by the field office computer 312 and/or the rig site computer 314. While each of the computers 310, 312 and 314 are shown to be individual computers, it should be understood that each of these computers may be single processor stand-alone computers, multiple-processor computers, or groups of computers performing the desired tasks.

Figure 4:
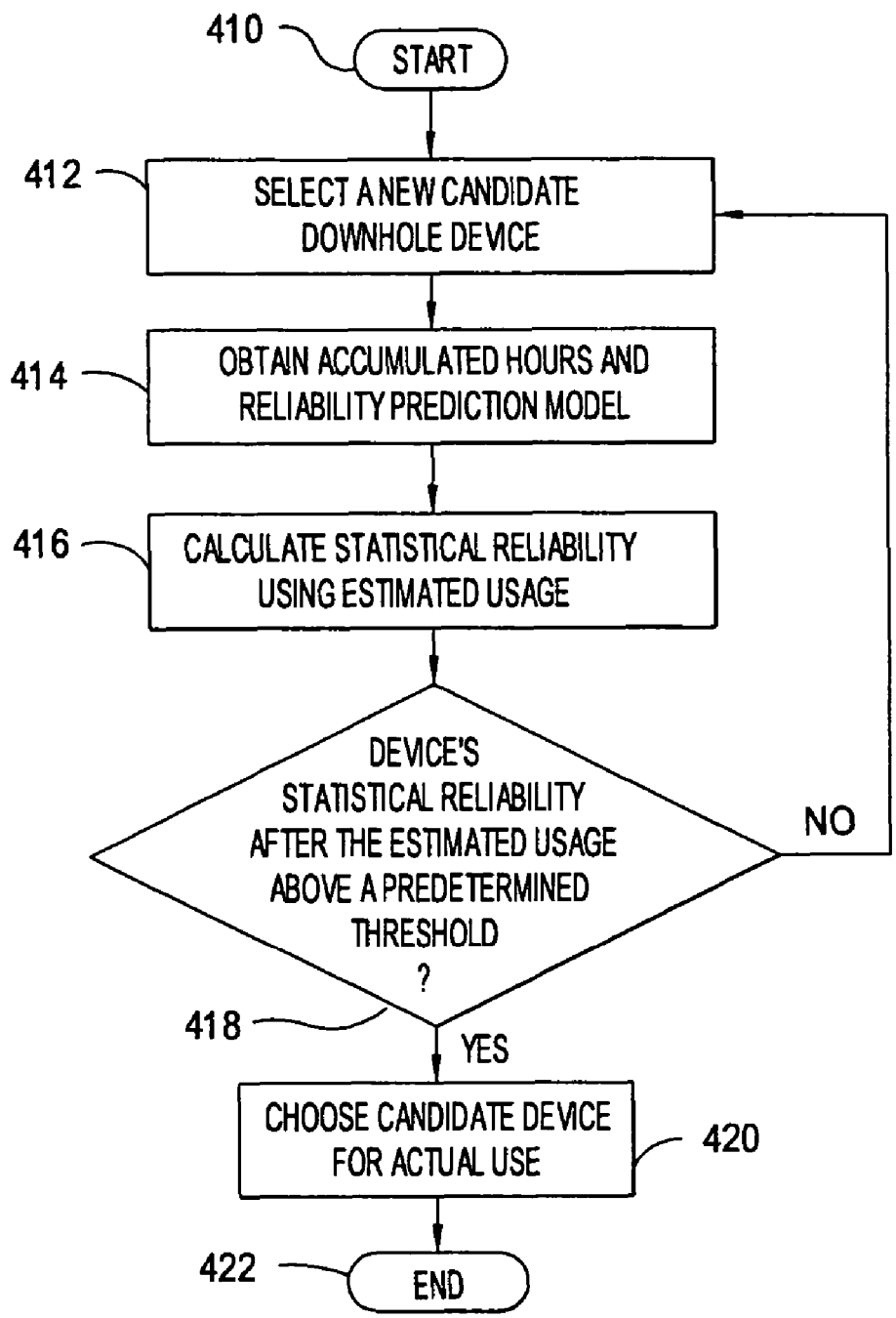
FIG. 4 illustrates a flow diagram which may be used to select a particular downhole device from a plurality of devices.

Consider now an exemplary situation of a field office at a remote location from the central office, and therefore at a remote location from the central computer 310. The field office may be responsible for maintaining, warehousing, and assigning various downhole devices to particular projects in their assigned geographic area. FIG. 4 illustrates a flow diagram which may be used in accordance with embodiments of the invention to select a particular downhole device from a plurality of devices to be assigned to a project. The steps illustrated in FIG. 4 will be discussed in relation to selecting a downhole device and determining whether that device should be used from the perspective of a field office; however, the steps may be equally applicable to use at a central office (if the central office maintains, warehouses and selects downhole devices for assignment to particular projects), and may also be applicable to decisions made at the rig site, to be discussed more fully below. The process may start (block 410) and proceed to the selection of a candidate downhole device from a plurality of possible devices (block 412). After selection of a candidate downhole device, the current accumulated operating hours, as well as the reliability prediction model, for the candidate downhole device may be obtained (block 414). In accordance with embodiments of the invention, obtaining the accumulated operating hours and reliability prediction model may involve accessing the information using field office computer 312. Field office computer 312 may download the information from the central computer 310, or alternatively may act as a terminal allowing the user access directly to the data base of information and models in the central computer 310. Alternatively, the downhole device itself may store its accumulated operating hours, and thus this information may be accessed from a memory on the downhole device. In the event that the candidate downhole device is new or has been recently rebuilt, the downhole device in its current condition may be at location 212 of the plot 210 (of FIG. 2). Alternatively, if the candidate downhole device has already accumulated operating hours, the device may be at location 214 in the exemplary plot 210.

The next step may be calculating or predicting a statistical reliability using the current accumulated hours, the reliability prediction model and the estimated usage (block 415). Stated otherwise, the field office computer 312 is programmed, or alternatively the central computer 310 is programmed if the field office computer 312 acts as merely a terminal, to make a calculation or prediction of the statistical reliability as if the candidate downhole device is operated in the amount of the estimated usage. Referring again briefly to FIG. 2, if it is assumed that the candidate downhole device initially, because of its accumulated operating time, lies on the plot 210 at point 214, the addition of the estimated usage may push the candidate downhole device to point 216.

Once the predicted statistical reliability calculation is made, a determination is made as to whether the downhole device's predicted statistical reliability is above a predetermined reliability (block 418). If the candidate downhole device's predicted statistical reliability falls below the predetermined threshold, the particular device may be unsuitable for the potential project, and a new candidate device may be selected (block 412). If, on the other hand, the predicted statistical reliability of the candidate downhole device is above the predetermined threshold, the device may be chosen for actual use (block 420), thus ending the process (block 422).

For purposes of example consider that a company does not wish to utilize a downhole device when its statistical reliability falls below=0.80 (80%). If a candidate downhole device initially has a statistical reliability (based on its accumulated operating hours) of 90%, and with the estimated usage predicted reliability is 85%, then the downhole device should still be above the predetermined threshold (in this case 80%) after its usage and should be acceptable. If the predicted reliability based on the estimated usage is less than 80%, then it may not be used in this example. Although the exemplary downhole device may not be suitable for the particular job, in other situations with less estimated usage and/or more docile operating conditions the exemplary downhole device may not fall below the predetermined threshold, and may be used. Further, downhole devices are most likely comprised of a plurality of components, with each component contributing to the overall statistical reliability. If a downhole device falls below the predetermined threshold when considering estimated use, it is possible that the one or more components of the overall downhole device may be replaced such that the predicted statistical reliability for the estimated usage may stay above the predetermined threshold.

Figure 5:
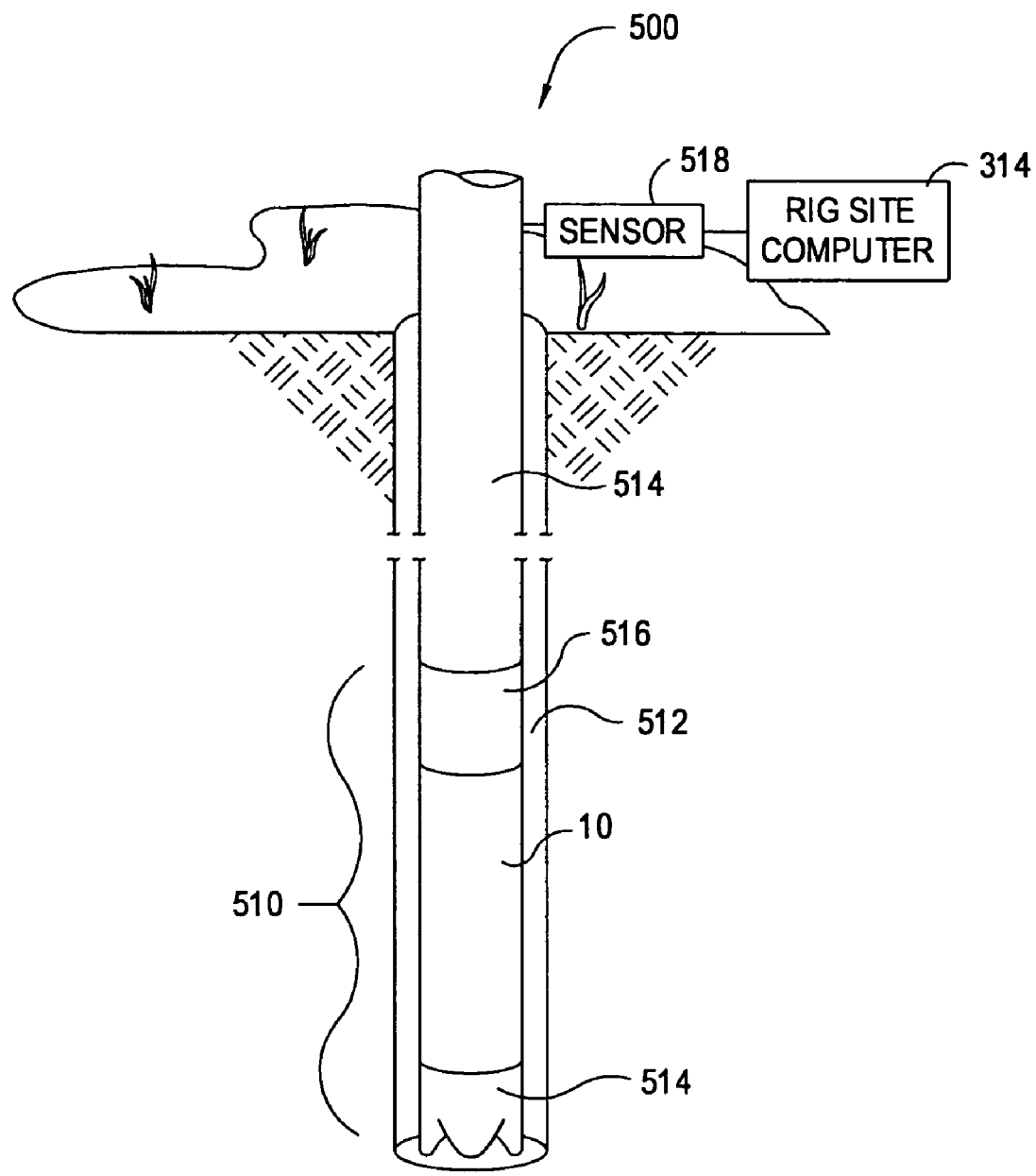
FIG. 5 illustrates a drilling system constructed in accordance with embodiments of the invention.

In addition to and/or in the alternative to predicting reliability before use, at least some embodiments of the invention are directed to updating a reliability prediction model for a downhole device as the device is being used. FIG. 5 illustrates a drilling system 500 constructed in accordance with at least some embodiments of the invention. In particular, the drilling system 500 may comprise a bottomhole assembly 510 in operational relationship to a borehole 512. The bottomhole assembly 510 may comprise a drill bit 514 of any suitable type, and a downhole device, such as a LWD tool 10. The bottomhole assembly 510 may couple to piping or tubing 514, which couples the bottomhole assembly to surface devices. In some embodiments, the drilling may take place using rotational energy imparted to the drill string at the surface. In addition to, or alternatively, the bottomhole assembly may also comprise a downhole mud motor (not specifically shown) which acts to, at least in part, rotate the drill bit 514. In yet further alternative embodiments, the bottomhole assembly 510 may be coupled to the surface by way of coiled tubing, and thus the downward force and rotational motion may be imparted by devices of the bottomhole assembly 510.

Regardless of the precise nature by which drilling takes place, a downhole device, in this case an exemplary LWD tool 10, accumulates operating hours during the drilling process. In accordance with embodiments of the invention, the surface or rig site computer 314 may track actual use time of the LWD tool 10, and substantially simultaneously update the reliability prediction model, which may have been previously provided or acquired from the central computer 310 (not shown in FIG. 5). The field engineer may thus determine the current statistical reliability of the downhole tool 10, and if the statistical reliability falls below a predetermined threshold, the tool may be tagged to be removed from the drill string and replaced with a downhole device whose statistical reliability may stay above the predetermined threshold. The tool removed from the drill string may be used in other, less harsh, environments, or the tool may be subjected to maintenance.

Operating conditions other than accumulated operating hours may also affect the time-to-failure of a downhole device. For example, a downhole device operated at 20° C. may have a 10,000 hour time-to-failure, whereas that same device operated in ambient conditions of 200° C., may have less than a 1,000 hour time-to-failure. Likewise, a downhole device that experiences significant acceleration forces, e.g. vibration, may have a shorter time-to-failure than a similar device experiencing little or no vibration. The exemplary logging tool 10 preferably monitors one or more downhole conditions, such as downhole temperature and vibrational (acceleration) forces. In some embodiments, the downhole condition information may be periodically telemetered to the surface. The rig site computer 314 may combine the actual use time with the downhole temperature and vibration data, and update the reliability prediction model for the LWD tool 10. In this way, the field engineer knows, in substantially real-time, the statistical reliability of the LWD tool 10 and may take note of when the statistical reliability as predicted by the reliability prediction module falls below a predetermined threshold. If the LWD tool 10, or any downhole device for which this information is tracked, falls below the predetermined threshold, the field engineer may schedule the downhole device for maintenance or repair while the downhole device is still downhole, and also replace the downhole device with a new or rebuilt device after the next "tripping" of the drill string. In the exemplary case of an LWT tool, the drilling engineer may schedule replacement of the tool 10 if its statistical reliability falls below 0.80 (80%) even though the tool continues to be fully functional.

In other embodiments of the invention, the field engineer or the downhole tool may automatically adjust one or more of the downhole tool's operational characteristics to decrease the rate of decay of the statistical reliability, which may help ensure completion of a drilling run. For example, if based upon the downhole conditions it is predicted that the downhole tool's battery will cease to be functional at the present sampling rate within one hour, and in order to complete the job two hours of battery life is needed, the tool may be instructed either by the field engineer via a command from the surface or by a processor control mechanism in the downhole device to reduce the sampling rate in order to complete the drilling run.

There are many mechanisms by which downhole conditions, such as downhole temperature and vibration data, may be transferred to the surface. In accordance with at least some embodiments of the invention, a mud pulser 516 may be a part of the bottomhole assembly 510. Data gathered regarding downhole temperature and/or vibration may be communicated to the mud pulser 516, and in turn, the mud pulser may create positive or negative pressure pulses in drilling mud within the drill string which propagate to the surface. At the surface, the rig site computer 314 may sense the communication through a sensor 518, decode the information, and then pass that information along to the program which updates the reliability prediction model for the downhole device such as LWD tool 10. While using mud pulse telemetry is preferred, other telemetry systems (e.g. electro magnetic or acoustic telemetry systems) may be equivalently used. Additionally, wired telemetry systems that may use wires or fiber optic cables incorporated within the tubing coupling the bottom hole assembly to the surface may also be equivalently used.

One or both of operating temperature and vibration may accelerate the time-to-failure for a particular device. An acceleration factor is a unitless number that relates a device's life at an accelerated stress level (high temperature and/or high vibration) to the life if temperature and vibration are not a factor. The acceleration factor may be defined substantially by the equation:

$$A_F = \frac{L_u}{L_A} \quad (1)$$

where $L_u$ is the life of the device where temperature and vibration are not a factor (the use stress level), and $L_A$ is the life at the accelerated level. The accelerated life may be calculated using methods such as Arrhenius or Eyring, familiar to those of ordinary skill in the art. In alternative embodiments, the affect temperature and vibration have upon the life of a downhole device may be determined through empirical studies. In yet further alternative embodiments, the results of the accelerated life calculations using Arrhenius and/or Eyring may be combined with empirical studies so that an acceleration factor may be determined. In accordance with embodiments of the invention, the stress added to a particular downhole device by virtue of its operation in high temperature and/or high vibration environments may be compensated for in the reliability prediction model by accelerating actual use time to have effective use time, longer than the actual use time. In particular, if a downhole device is operating in relatively low temperatures, then the accumulated hours for the downhole device may be substantially a one-to-one relationship. As the downhole temperature and/or vibration increases, the time-to-failure of the device may accelerate, and this may be compensated for in the reliability prediction model by increasing the accumulated hours faster than actually accumulated. For example, if a downhole device such as the LWD tool 10 is operated for ten hours at a downhole temperature of approximately 50° C., the accumulated operating hours in the reliability prediction model may be increased, e.g. by ten hours, a one-to-one relationship. If the downhole device operates for ten hours at a downhole temperature of approximately 175° C., the accumulated operating hours may be incremented, e.g. by fifty hours, a 1-to-5 relationship.

In accordance with at least some embodiments of the invention, the central computer 310 is the primary repository for the reliability prediction model for a downhole device. When applying an estimated usage (and possibly expected temperature and vibration) to determine if a particular downhole device will remain above a predetermined threshold if selected, either the central computer 310 or the field office computer 312 may calculate the predicted reliability. If the field office computer calculates the predicted reliability, a copy of the reliability prediction model may be transferred to the field office computer 312. In embodiments where a the current statistical reliability for a downhole device is calculated in substantially real time during use of the downhole device, the central office computer 310 may update the reliability prediction model with data supplied from the rig site computer 314 (some of the data, e.g. downhole temperature, telemetered to the surface by the downhole device). Alternatively, the central office computer 310 may transfer a copy of the reliability prediction model to the rig site computer 314, and the rig site computer 314 may update the model with actual time and environmental data sent to the surface. In embodiments where the rig site computer 314 updates the model, after completion the rig site computer 314 preferably transfers the updated model back to the central office computer 310.

In the embodiments discussed above, downhole data (such as downhole temperature) may be telemetered to the surface during drilling operations (e.g., as raw data, compressed data, and/or in a form indicative of the downhole information). In alternative embodiments, the downhole device, such as LWD tool 10, may store the downhole temperature experienced within the tool. When the downhole device is raised to the surface, this information may be downloaded, and the reliability prediction model likewise updated. In yet further alternative embodiments, the downhole device itself may store the reliability prediction model and determine its predicted statistical reliability. In these alternative embodiments where the downhole device stores and updates the reliability prediction model, rather than telemetering temperatures, vibrations, and the like, to the surface, the current statistical reliability may be telemetered to the surface.

The above discussion is meant to be illustrative of the principles and various embodiments of the present invention. Numerous variations and modifications will become apparent to those skilled in the art once the above disclosure is fully appreciated. For example, the discussion above is directed to using statistical reliability as the factor in determining whether to use, or to continue to use, a particular downhole device. However, the probability of failure may be equivalently used. Further, other parameters may be used in updating a reliability prediction model, yet these parameters were not discussed above so as not to unduly complicate the discussion. For example, a reliability prediction model take into consideration shock acceleration levels, a count of shock accelerations, frequency content and/or power spectral density of vibration, axis of shock acceleration, a count of thermal cycles, thermal cycle rates, and/or number of actuation cycles. Further still, parameters related to functioning of downhole devices may likewise factor into the reliability prediction model, such as number of actuations of a device, voltage levels experienced by electronic devices, charge/discharge cycles, electrical current consumed, and the like. It is intended that the following claims be interpreted to embrace all such variations and modifications.

What is claimed is:

1. A method comprising:
   predicting reliability for a downhole device using expected downhole condition or expected use time, the downhole device being at least one selected from the group consisting of: a logging-while-drilling tool; a measuring-while-drilling tool; a mud pulser; a mud siren; a rotary steerable assembly; and a mud motor;
   selecting the downhole device for use in a drill string if the predicted reliability is above a predetermined threshold; and
   utilizing the selected device in the drill string during a drilling operation.

2. The method as defined in claim 1 wherein predicting further comprises predicting reliability using an expected downhole temperature.

3. The method as defined in claim 2 wherein predicting further comprises predicting reliability using a modified time being the expected use time increased as a function of expected downhole temperature.

4. The method as defined in claim 1 wherein predicting further comprises predicting reliability using the magnitude of expected downhole vibration.

5. The method as defined in claim 4 wherein predicting further comprises predicting reliability using the expected use time increased as a function of the magnitude of the expected downhole vibration.

6. A computer-readable medium storing a program executable by a processor of a computer system, and when executed the program causes the processor to:
   receive an estimated time a downhole tool will be in service within a bore hole; and
   predict reliability of the downhole tool based on the estimated time.

7. The computer-readable medium as defined in claim 6 wherein the program causes the processor to:
   wherein when the processor receives, the program causes the processor to receive an estimated time and an expected temperature within a borehole;
   wherein when the processor predicts, the program causes the processor to:
      calculate an effective time based on the estimated time and the expected temperature wherein the effective time increases over the estimated time when expected temperature exceeds a threshold; and
      predict reliability of the downhole tool based on the effective time.

8. The computer-readable medium as defined in claim 6 wherein when the processor predicts reliability the program causes the processor to:
   predict reliability of a plurality of downhole tools based on the estimated time; and
   recommend use of at least one of the plurality of tools whose predicted reliability based on the estimated time is above a preset threshold.

9. The computer-readable medium as defined in claim 8 wherein the program causes the processor to:

wherein when the processor receives, the program causes the processor to receive an estimated time and an expected temperature within a bore hole;

wherein when the processor predicts reliability, the program causes the processor to:

calculate an effective time based on the estimated time and the expected temperature wherein the effective time increases over the estimated time when expected temperature exceeds a threshold; and predict reliability for each of the plurality of downhole tools based on the effective time.

\* \* \* \* \*